Oct. 30, 1951         E. J. RABENDA         2,573,356
ACCOUNTING MACHINE FOR COMPARING TOTALS ON TWO ACCUMULATORS
Filed Sept. 30, 1950         10 Sheets—Sheet 1
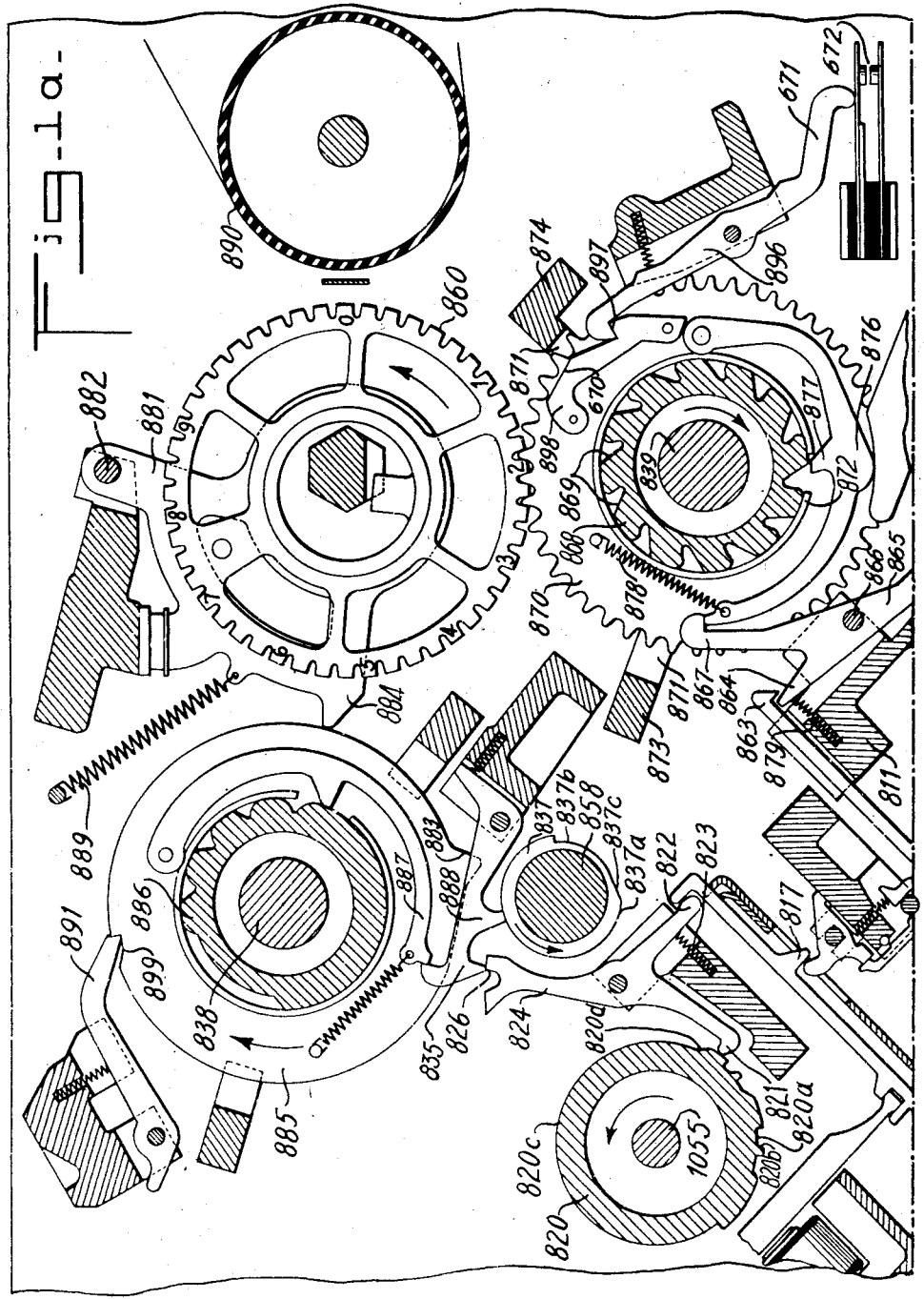
INVENTORS
Edward J. Rabenda
BY
ATTORNEY

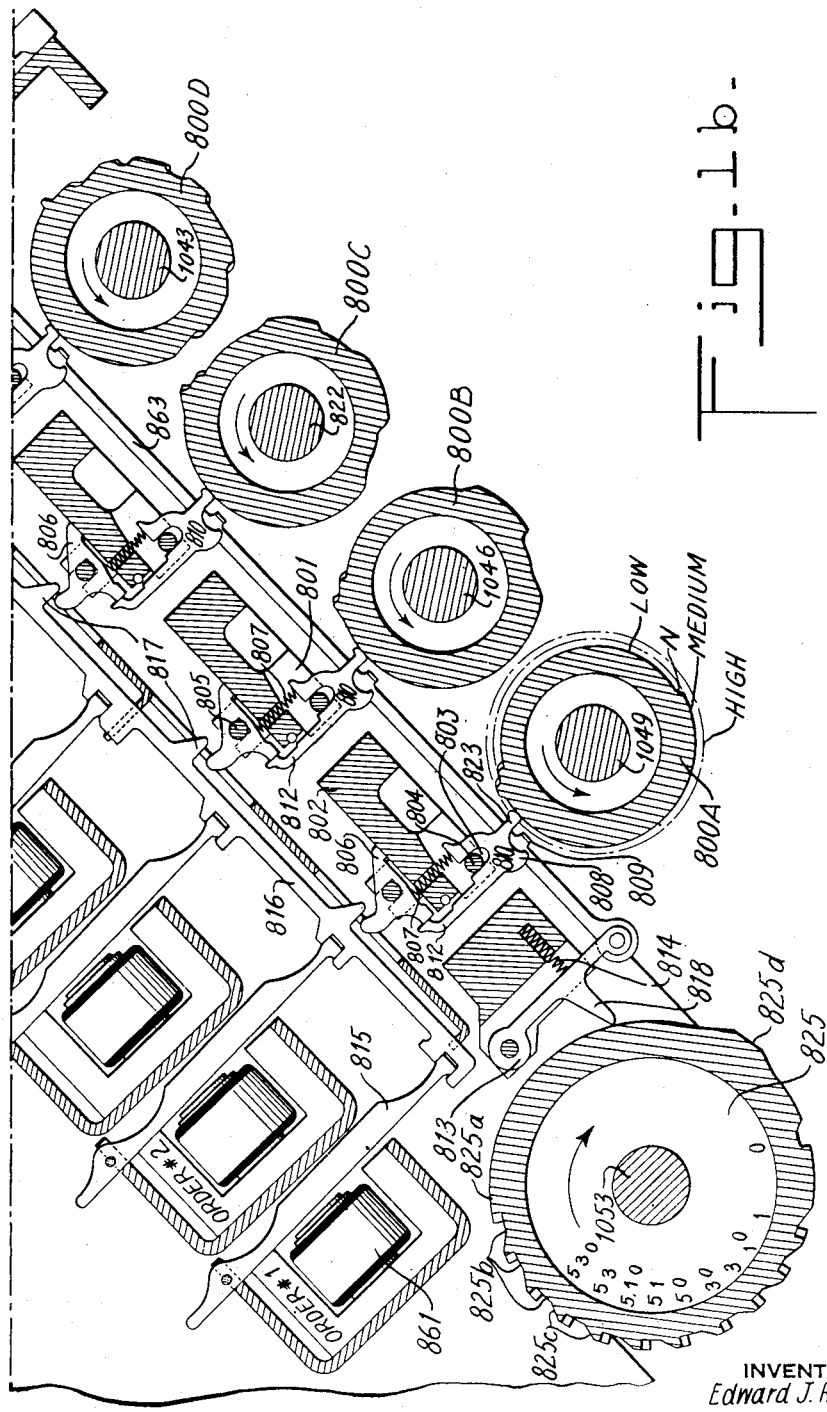

Oct. 30, 1951      E. J. RABENDA      2,573,356
ACCOUNTING MACHINE FOR COMPARING TOTALS ON TWO ACCUMULATORS
Filed Sept. 30, 1950      10 Sheets-Sheet 3

INVENTORS
Edward J. Rabenda
BY
J. W. Lommitzer
ATTORNEY

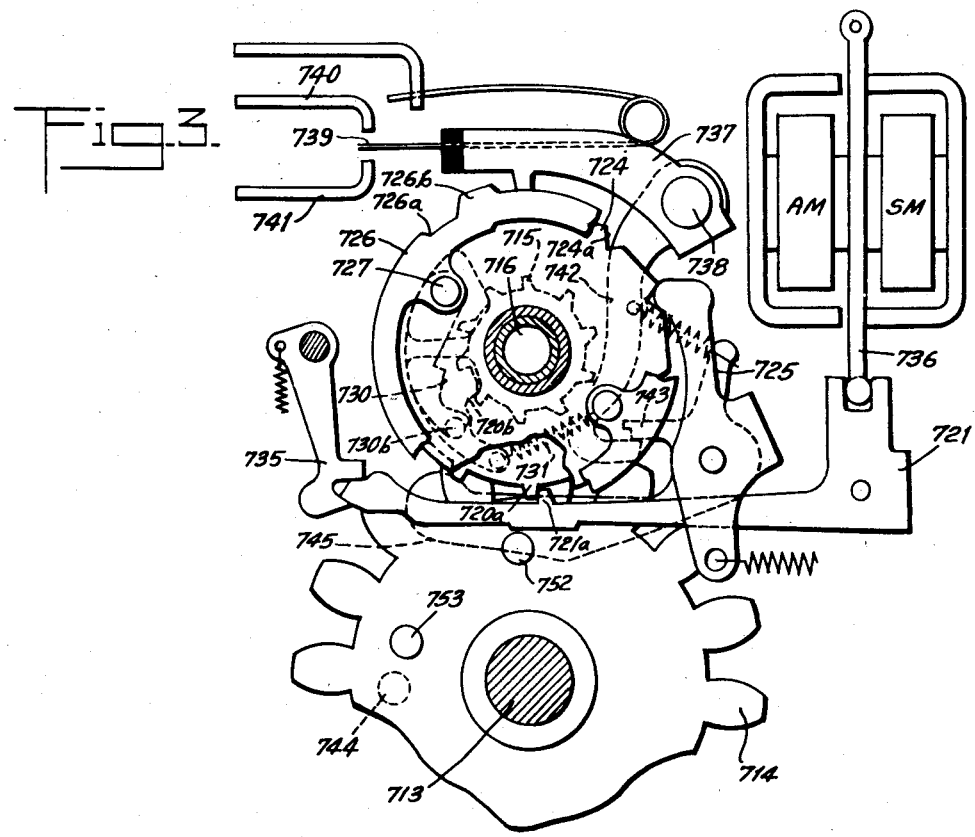

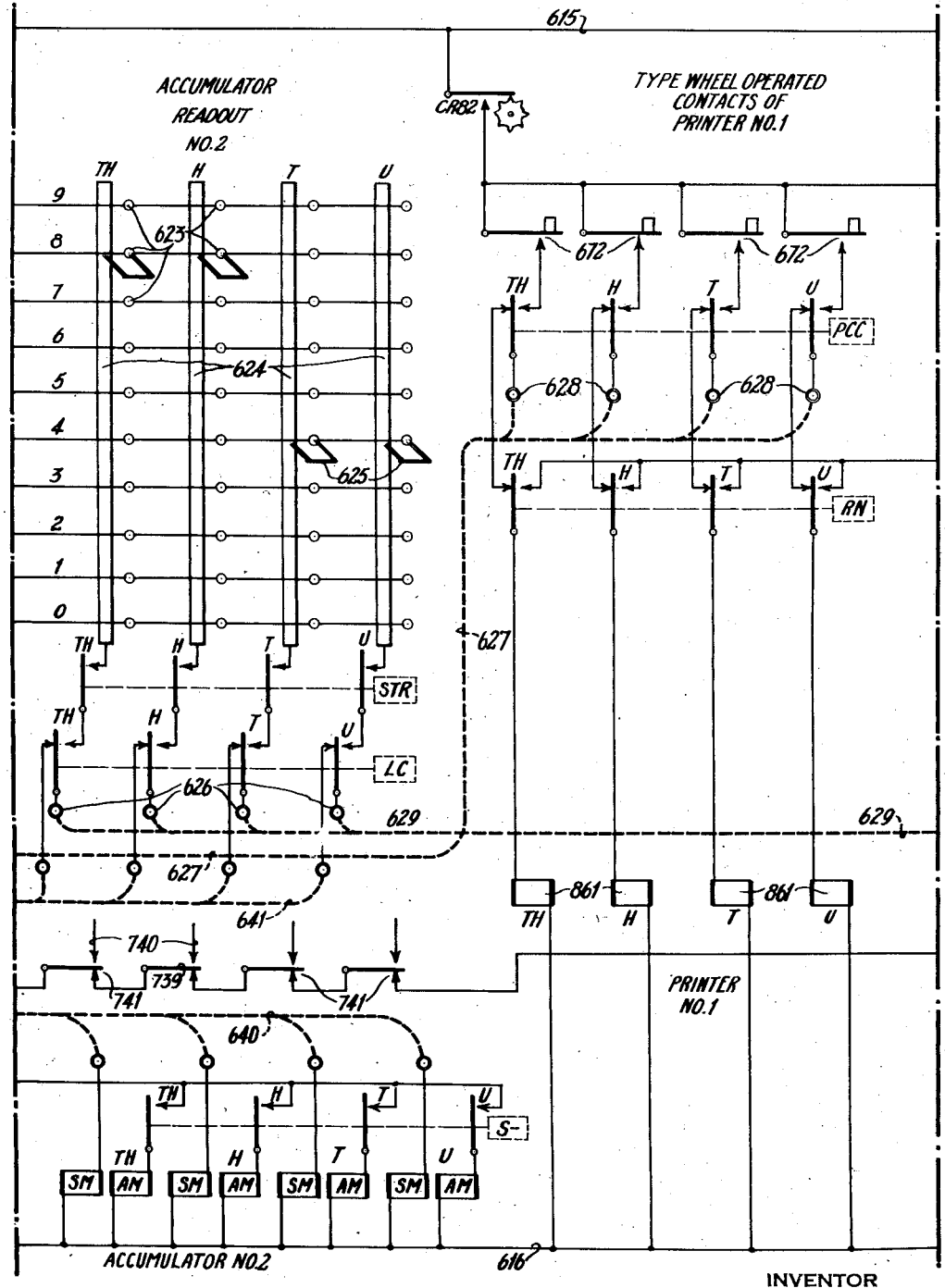

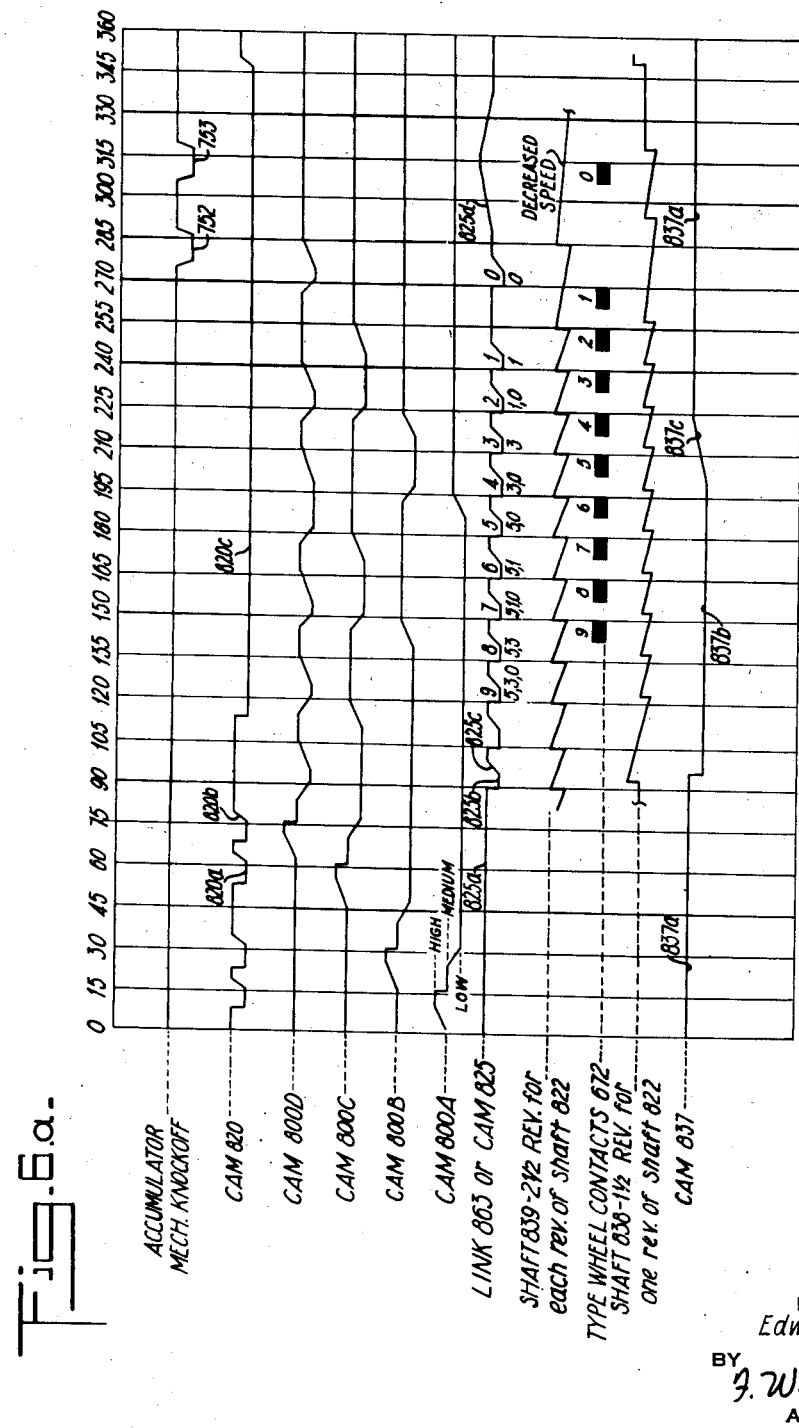

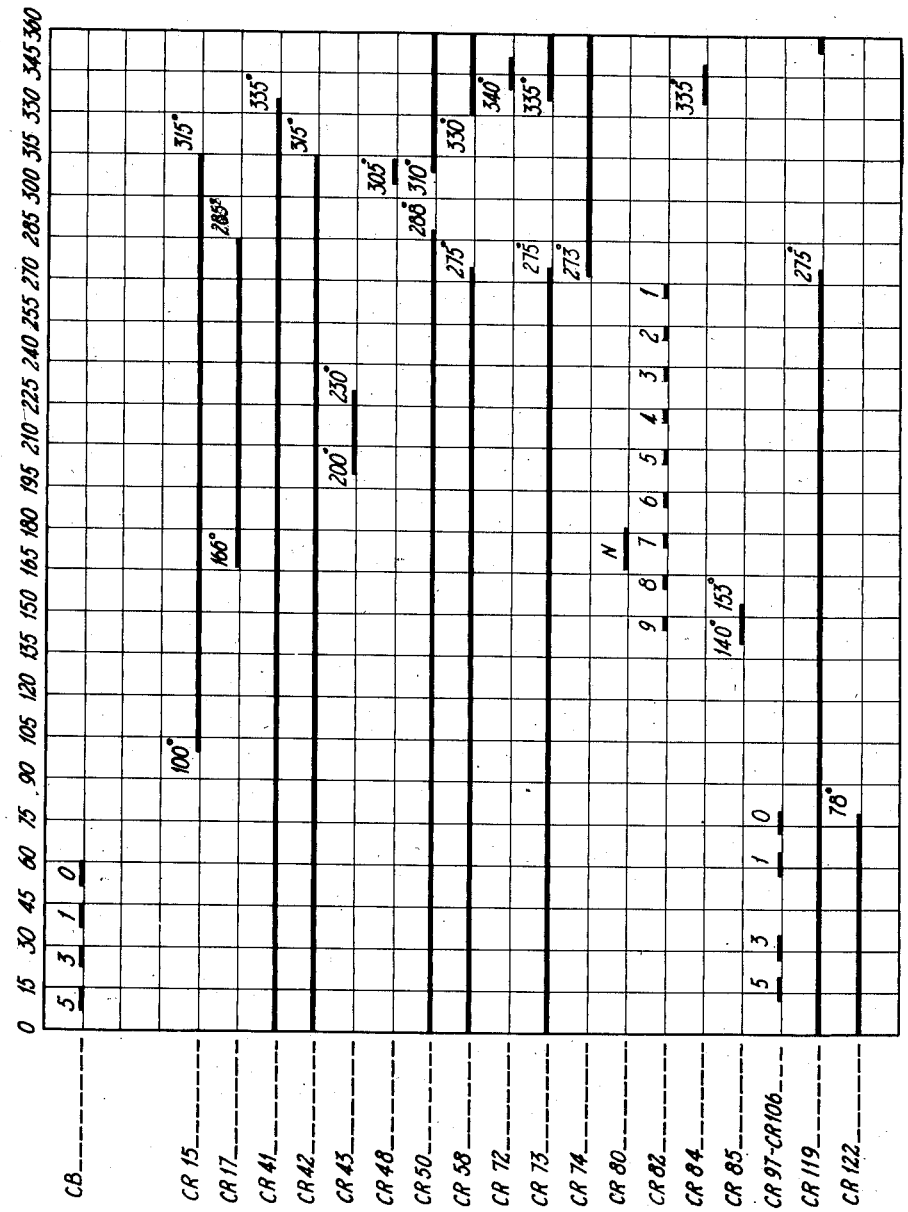

Patented Oct. 30, 1951

2,573,356

UNITED STATES PATENT OFFICE 2,573,356

ACCOUNTING MACHINE FOR COMPARING TOTALS ON TWO ACCUMULATORS

Edward J. Rabenda, Poughkeepsie, N. Y., assignor to International Business Machines Corporation, New York, N. Y., a corporation of New York Application September 30, 1950, Serial No. 187,727

6 Claims. (Cl. 235—61.7)

This invention relates to accounting machines and more particularly to the type wherein duplicate amounts are entered in a plurality of accumulators.

Whenever items or amounts of an original and duplicate report are printed in an accounting machine and the same items or amounts are entered in a pair of accumulators so that the total of such items may be printed on the original and duplicate report it is desirable to verify such totals. If such totals are correct it may be assumed that the items have been correctly entered in the pair of accumulators.

It is, therefore, a main object of the present invention to compare totals on two accumulators which have received identical amounts by causing each accumulator to be reset under control of the other, both being restored to normal when totals are identical, and either one failing to be restored to normal when such totals disagree.

Another object of the invention is to print in one cycle the totals represented on a pair of accumulators which supposedly have received identical amounts, and in the same cycle concurrently resetting both accumulators by resetting one accumulator under control of the other.

A still further object of the invention is to concurrently reset in one cycle two accumulators representing identical totals by resetting each accumulator under control of the other and to test each accumulator to determine whether each has been restored to a reset position.

Another object of the invention is to cause two printing mechanisms to be set under control of the readouts of two accumulators which represent identical totals, and provide for the transmission of electrical impulses by the elements of the printing mechanism to reset the accumulator which did not control that printing mechanism through its readout, two sets of such impulses being concurrently directed by the two printing mechanisms to thus simultaneously reset both accumulators.

It is intended that both accumulators receive identically entered items in a suitable manner and while it is preferable to enter such items under control of perforated records, as explained herein, such form of entry means should not be regarded as a restriction of the invention. Again, by obvious changes each accumulator may be directly reset under control of the readout of the other accumulator, and not indirectly as shown herein through reset impulses transmitted by the printing mechanisms.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1a, 1b, with Fig. 1a joined on top of Fig. 1b, represent a sectional view showing one order of the printing mechanism employed herein for printing the digits of the total and transmitting the digit reset impulses.

Fig. 3 is a view in side elevation of the preferred form of accumulator.

Fig. 4 is a view in side elevation of the accumulator shown in Fig. 3 but showing the parts in operated position in order to more clearly understand the construction and operation.

Figure 2:
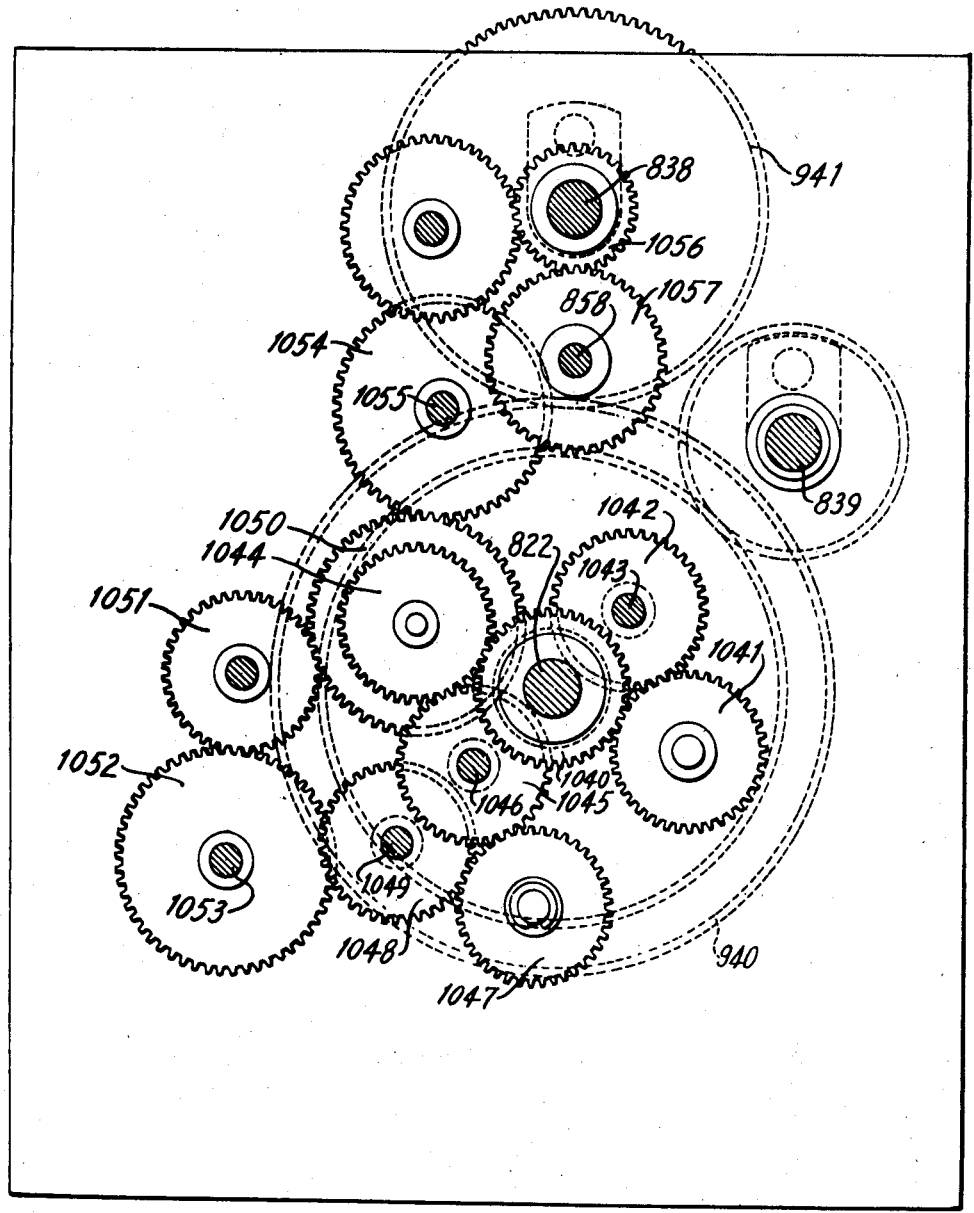
Fig. 2 is a view in side elevation of the gear drive for the drive shafts of the printing mechanism.

Figs. 5a, 5b, 5c and 5d comprise the wiring diagram of the machine when joined in the named order.

Figs. 6a and 6b, when joined with Fig. 6a on top, comprise a time chart of the machine.

Amount entering mechanism

The present invention is preferably embodied in a machine of the record controlled type wherein the same amounts are concurrently entered into a pair of accumulators according to the digit representations on a single field of a perforated record, which records are passed successively through the machine. Since the entry mechanism forms no part of the present invention it is not shown herein but the present machine is intended to include a pair of entering mechanisms under control of combinational hole records, such as is shown in the patent application of H. S. Beattie et al., Serial No. 34,726, filed June 23, 1948, now Patent No. 2,551,088, or it may comprise the form of entering mechanism shown in the patent to R. E. Page et al., No. 2,484,114, issued October 11, 1949, which shows a sensing and entering mechanism controlled by records perforated according to the Hollerith type of card. It is obvious, of course, that the present improvements can also be incorporated in accounting machines of other types, such as those controlled by keys, levers, and other forms of record strips, etc.

Therefore, it is intended that the amounts be entered under control of some form of digit entering and controlling devices and concurrently or successively entered into a pair of accumulators. According to the present invention there is provided two accumulators, both receiving and accumulating the same amounts pertaining to each classified group which then represent the same total, if the items have been correctly entered in each accumulator. As will be clearer later on, novel means is provided to determine whether the totals represented in both accumulators after a series of entry operations are alike.

Both accumulators are alike in their construction and the construction of one is shown in detail in Figs. 3 and 4.

The accumulators

In Figs. 3 and 4 the driving shaft 113 is driven by main drive shaft 822 in any suitable manner so as to make one revolution for each cycle of operation. For each denominational order of the two amount receiving accumulators, shaft 113 has a gear 114 secured thereto which drives the accumulator wheel clutch mechanism. The accumulator and clutch driving mechanisms are preferably of the same construction as shown in Lake et al., Patent No. 2,328,653 and Daly, No. 2,377,762 and include a ratchet 115 which is free on post 116 and integral with a gear 117 driven by gear 114 (Fig. 3). Rotatably carried by post 116 is a disk 720 having ten teeth 120a adapted to be engaged by a tooth 721a on the long arm of a clutch lever 721 to hold the disk against rotation in a counterclockwise direction.

At the side of disk 720 is an accumulator wheel 724 rotatable on post 116 and provided with ten peripheral notches 724a. Wheel 724 may take any of ten rotative positions with the values 0, 1 ... 9. A spring-pressed lever 725 engages with a notch 724a of wheel 724 to hold the wheel impositively and to center it in the value position into which it has been rotated. A transfer cam 726 is fixed to the side of wheel 724 and a stud 727 in wheel 724 extends through an opening in disk 720 to pivotally carry a clutch dog 730. A spring 731 urges the tooth of dog 730 to engage ratchet 115. In the position shown in Fig. 4 the clutch lever 721 is in declutching position, its tooth 721 is restraining rotation of disk 720 counterclockwise and dog 730 is clear of ratchet 115. The dog 730 is being held clear of the ratchet by coaction of a pin 730b on the dog with a cam edge 720b of disk 720.

When the clutch lever 721 is dropped to cause its tooth 721a to release the disk 720 for counterclockwise movement the spring 731 is effective to rock the dog 730 into engagement with ratchet 115. During this movement of the dog 730 its pin 730b rides along the cam edge 720b and cams the disk counterclockwise until its tooth 720a previously engaged by tooth 721a is to the right of the latter tooth. The parts are then in the clutching position shown in Fig. 4, and the wheel 724 is coupled to the driving device 115, 717 for rotation. Through engagement of the pin 730b of the dog 730 with cam edge 720b, the disk 720 is forced to rotate counterclockwise together with the register wheel.

When the clutch lever 721 is returned to upper declutching position its tooth 721a intercepts a tooth 720a of disk 720 and stops the disk. Accumulator wheel 724 and dog 730 continue rotating while cam edge 720b of disk 720 cams the pin 730b outwardly until it is again in its outer position. As the pin 730b is cammed outwardly clutch dog 730 moves clear of ratchet 115 and declutches the accumulator wheel from the driving means. The accumulator wheel is then held and centered in its new value position by lever 725. A spring-urged latch 735 serves to hold lever 721 in either clutching or declutching position.

The clutch lever 721 has a short arm swiveled to the lower end of an armature 736 which is disposed between an advance magnet AM and a stop magnet SM. Energization of magnet AM rocks armature 736 clockwise to lower lever 721, and energization of magnet SM rocks armature 736 counterclockwise to raise the lever 721.

When the wheel 724 is in its 0, 1 ... 8 positions, the cam 726 holds a carry lever 737 pivoted at 738 in the position shown in Fig. 3, where a contact blade 739 (insulated from lever 737) takes a midposition between contact elements 740 and 741. When the wheel is in its 9 position a tooth on lever 737 is dropped into a cut 726a of cam 726 and blade 739 contacts element 741. When the wheel 724 passes from the 9 to 0 position a rise 726b rocks lever 737 to cause blade 739 to engage element 740. When the lever is so rocked an arm 742 integral therewith is engaged and held by a spring-urged latch 743 which maintains the contact engagement between 739 and 740 until a pin 744 in gear 714 strikes an arm 745 integral with the latch 743 to release lever 742. The point in the cycle at which such unlatching occurs is indicated in the time chart. The accumulator is also provided with a mechanical knockoff or declutching mechanism which comprises pins 752 and 753 secured to the side of gear 714 and adapted during rotation of gear 714 to ride in succession under an edge of clutch lever 721.

Assume the clutch lever to be in lower position, when either pin 752 or 753 engages lever 721, it cams it upwardly into the position of Fig. 3 to disengage the clutch. The knockoff pins 752 and 753 are effective at fixed points of the cycle as indicated in the timing diagram of Fig. 6a. Knockoff pin 752 is used for clutch disengagement at the end of an entry, and 753 at the termination of a unit carry.

Total readout

Each accumulator shown herein is provided with an electrical total readout which may be of the form shown and described in the patents to C. D. Lake et al., No. 2,232,006 and No. 2,138,-636 and G. F. Daly, No. 2,377,762. Since the construction of each electrical total readout is well known in the art it is only shown diagrammatically in the wiring diagram of Figs. 5b and 5c. As shown therein rotatable with an accumulator wheel of each order is a brush 625 which makes contact with a common current conducting segment 624 and with one or another of the digit points or segments 623 according to the digit representation of the accumulator order. The same digit contact points 623 are interconnected by wires marked 0–9, or they may be strips also engaged by brushes 625. The digit segments 623 receive digit impulses 5, 3, 1, 0 transmitted by cam contacts CR97–CR106 and according to the digit positions of each readout order, selected impulses 5, 3, 1, 0 are transmitted to a combinational code translator, and converted thereby to a decimal digit equivalent to select the digits to be printed and to transmit the reset impulse.

Translator and total digit printing mechanism

The present machine is provided with two printing mechanisms, each of which is adapted to print items entered into each accumulator and as shown herein to also print the totals entered in the associated accumulator. As will be evident from the above the accumulator values are not read out from the total readout as decimal representations but by combinational coded representations which are translated to the decimal equivalents by a translator and total printing mechanism which will now be described.

Reference character 822 (Figs. 1b and 2) represents a shaft which is rotated one revolution for each machine cycle. The shaft which drives the card feed mechanism is driven by shaft 822, and interposed between the card feed shaft and shaft 822 is the card feed clutch which is engaged by the energization of the card feed clutch magnet. The card feed clutch is well known and the control magnet corresponds to card feed clutch magnet 48 of Fig. 6 of Patent No. 2,042,324.

There will now be described the translating or converting mechanism which converts the combinational digit representations transmitted under control of the readout to a decimal equivalent which is necessary to select digit type to print the digits of the total.

Cams 800A, 800B, 800C and 800D (Fig. 1b) are driven by driving means to be subsequently described one revolution for each cycle of operation of the machine. It will be noted that these cams differ in their cam contours and the particular cam portion which is effective in each point of the operating cycle is shown in the timing diagram of Fig. 6a. Each of the cams is provided with cam heights which are identified by three dotted circles associated with the cam 800A, which circles are of three different diameters and represent the heights of the cam contours as Low, Medium and High. The corresponding designation is shown in the timing diagram of Fig. 6a for such cams to identify the particular cam portion effective in each point of the operating cycle. The cams 800A, 800B, 800C and 800D may for convenience in construction be extended longitudinally to provide fluted cam rods having the configuration and outline in Fig. 1b to cooperate with a plurality of orders.

Each cam 800 cooperates with a related releasing and blocking member 810. The reason that the member 810 is called a releasing member is that when elevated a predetermined distance by the Medium or High cam portion of the related cam 800 it will release the operating link 863 for movement but when in its normal lower position (due to the Low cam portion) it will block the link 863 against movement. Each member 810 is slidably mounted in a slot 801 of a guide block 802 and is further guided by a rod 804 which receives a guide slot 803 of the related member 810. Also pivoted on a rod 805 carried by the block 802 is a latch pawl 806. Interposed between the pawl 806 and the associated member 810 is a compression spring 807, the spring 807 functioning to urge the member 810 downwardly so as to always press against and contact with the cam contour of the related cam 800. Each member 810 is provided with a shoulder 808 cooperating with a lug 809 formed as an integral part of the link 863.

The link 863, referring to Fig. 1a, is slidably mounted in guide slots formed in a support plate 811 to support the link 863 at one end and guide its movement, and referring to Fig. 1b the other end of the link 863 is dependently hung by arm 813, which arm has a cam follower extension 818. A compression spring 814 fitting in a spring support and guide block for arm 813 urges the link 863 to the left and when such spring is effective for action under control of a cam 825 it serves as the source of mechanical impulse transmitted to link 863 at a differential time to rock a clutch release arm 867 to engage a clutch to initiate rotation of a type wheel.

Recalling now that each cam 800 has cam contours of three different heights, it should be observed that when member 810 is at a position determined by the low portion of the cam 800 the shoulder 808 abuts lug 809 to block the link 863 from movement to the left, urged by compression of the spring 814. In attempting to do so lug 809 will bear against the shoulder 808 and urge the member 810 clockwise, which movement is restrained by the cooperation of an upstanding hooked portion 812 of member 810 against the latching end of the pawl 806. Assuming now that a cam has been rotated so that the Medium cam portion of the cam contour has raised the member 810, such difference in cam height with respect to the Low cam height will elevate shoulder 808 slightly further above the related lug 809 and by the continued cooperation of the hooked extension 812 of the member 810 with the extremity of the pawl 806, clockwise movement of the pawl 810 will still be restrained.

Assuming now that the High cam portion has positioned the member 810 to its maximum height, the shoulder 808 will be still further above the lug 809 and the member 810 is now in such position that the compression spring 807 will be effective to rock the member 810 clockwise so that a hooked extension 812 will catch over the latch end of pawl 806, provided that at this time the pawl 806 is rocked counterclockwise due to the transmission of an impulse to magnet 861 at the time the member 810 is in its highest position. If the pawl 806 is not rocked slightly counterclockwise, no latching of the member 810 will take place. Summarizing, whenever the High portion of a cam has elevated a member 810 to the highest position such member will be latched if the related pawl 806 is concurrently rocked to latching position. If there is no rocking of the pawl 806 at this time member 810 will not be latched, and will be subsequently free to move up and down in accordance with the successive cam contour as the related cam 800 rotates.

The above description has been confined to the operation of the parts under control of the cam 800A but it should be noted that identical operations are effected under control of the remaining cams 800B, 800C and 800D. For this reason, the description of operation need not be repeated for duplicate parts.

For the purpose of rocking the pawls 806 to latch those members 810 which are at their highest position it will be seen that referring to Fig. 1b each translator control magnet 861 when energized attracts an armature 815 and rocks the same so as to shift a related connected link 816 to the left. Extending from the link 816 are four internal extensions 817, each of which cooperates with the related pawl 806. The result of this construction is that the impulse directed to the magnet 861 will shift the link 816 and rock the four pawls 806 concurrently but only that pawl 806 is effective for latching the related member 810 if the associated member 810 has been elevated to its highest position. Therefore, one or more of the pawls 806 may be rocked idly at the same time without latching the related members 810.

To prevent the armature 815 from sticking to the core of the magnet 861 due to residual magnetism it is desirable to provide means to positively restore the link 816 and armature 815 to normal by mechanical means timed with the rotation of the cams 800. To this end there is provided a magnet knockoff cam 820 (Fig. 1a) notched as shown. A follower arm 821 of a clutch release arm 824 cooperating with the cam 820 has a depending arm 822 urged by a spring 823 against an upstanding finger of the link 816. At the time the magnet 861 is energized it will be observed that follower arm 821 cooperates with a notch 820a of the cam 820. Thereafter, such arm cooperates with the following cam portion 820b to rock arm 821, link 816 and armature 815, restoring the armature 815 to normal if it should remain attracted to the core under the above circumstances.

Referring now to Figs. 6a and 6b, it is obvious that at the time the impulses 5, 3, 1, 0 are directed by cam contacts to be described to magnets 861, one of the cams 800 will have its High portion in cooperation with the latching members 810. For example, at the time the 5 impulse is directed the High portion of cam 800A will be effective. At the time the 3 impulse is directed only cam 800B will have a High portion effective at this time. For all of the electrical impulses 5, 3, 1, 0, this condition may be represented by the following table:

| Impulses | Members 810 Latched |
|---|---|
| 5 | 810A |
| 3 | 810B |
| 1 | 810C |
| 0 | 810D |

It is obvious from the above table that members 810 are latched singly or in predetermined combinations, according to the code so that at the termination of the transmission of the electrical impulses 5, 3, 1, 0 all or some of the members 810 will be latched, and others will not be latched and therefore free to be positioned according to the contour of their cams during their subsequent rotation. It is explained that once a member 810 is latched it is not free to thereafter move upwardly and downwardly in accordance with the subsequent cam contour of the related cam, but remaining unlatched members 810 can do so.

Movement of the operating link 863 to the left during the time that the 5, 3, 1, 0 impulses are transmitted, which movement might be permitted if all of the four members 810 for this order may be either latched or elevated so as to be above the lugs 809, is restrained by a cam portion 825a of cam 825 (Fig. 1b). This cam, through driving means to be subsequently explained, is driven synchronously with the cams 800 and 820 and cooperates with the follower extension 818 of arm 813. As shown in the timing diagram, during the transmission of 5, 3, 1, 0 impulses, the High portion 825a of cam 825 will restrain movement of the operating link 863 to the left.

After latching of members 810 in predetermined combinations the contour of the cams 800A, 800B, 800C and 800D which are thereafter effective will determine the time in the operating cycle that the operating link 863 will be moved to the left in a manner now to be described in detail:

After one or more members 810 are latched in combination according to the impulses transmitted as indicated in the preceding table, the further rotations of the cams 800A, 800B, 800C, 800D will raise and lower the remaining unlatched members 810 according to the cam contours of the respective cams, but during said further rotation of the cams the link 863 will be restrained against movement by one or more of such unlatched members until a point is reached in the operating cycle when the cams related to the unlatched members concurrently present cam operations of Medium height to the unlatched members. It will be recalled that since the latched members 810 are so positioned that they do not restrain the movement of the link 863 under the influence of the spring 814 and further the elevation of any unlatched member by a cam portion of Medium height will also unlock the link 863, it is obvious that when both of these conditions exist for four of the members 810, the link 863 is then free to move under the influence of the spring 814 and cam 825. This will be made clear by reference to a particular example.

If, for example, the 5, 3, 0 impulses (representing 9 because a "0" impulse also signifies a "1") are transmitted under control of a readout order when it represents 9 members 810A, 810B and 810D are latched due to the High cam portions of their respective cams 800A, 800B and 800D and such latching of members 810A, 810B and 810D is completed about 75° of the operating cycle (see Fig. 6a). At this time, the members 810A, 810B and 810D are latched in the highest position so that they unlock the operating link 863 at such positions. However, cam 800C in its subsequent rotation continues to lower and raise the related unlatched member 810C and such unlatched member 810C will restrain the operating link 863 from movement until about 123° of the operating cycle, at which time cam 800C through its Medium high cam portion shifts related latching members 810 to unlock the link 863. At this time cam follower extension 818 of the arm 813 will cooperate with the notch 825b designated 5, 3, 0 in both Fig. 1b and the timing diagram of Fig. 6a. Operating link 863 is now unlocked at four points and the movement of the link to the left is effected at about 123° by spring 814. The link will now operate the clutch release arm 867 and therefore engage a type selecting clutch to be described to initiate the rotation of the printing wheel 860 to select the numeral type 9.

Reverting now to Fig. 1b, when the operating link 863 is moved to the left to effect the engagement of the type selecting clutch the cam follower extension 818 is in the bottom of the notch 825b of the cam disk 825 and further rotation of the cam 825 in a clockwise direction will, through the following inclined cam portion 825c, cooperate with the cam follower extension 818 to positively restore the operating link 863 to the right without, however, causing the unlatching of any latched member 810. At about 315° an extra High cam portion 825d will shift link 863 to the right beyond the normal position, and in so doing for those members 810 which have been latched lug 809 will engage the shoulder 823 of the respective member 810 to rock the same counterclockwise to unlatching position, spring 807 being compressed during this operation to rock pawl 806 to normal position. With respect to any unlatched member 810, movement of the link 863 to the right at this time may also effect movement of such members 810 but the operation of such is ineffective.

While the operation of the machine has been described in connection with the manner of engaging the type wheel clutch when the 5, 3, 0 impulses are transmitted, to select the 9 type when a readout order represents 9, the same principle of operation for effecting the above results is involved for other combinations of impulses as is evident from the following table:

| Readout Digit Representation | Impulses Transmitted | Members 810 Latched | Cams 800 at MEDIUM Cam Portion |
|---|---|---|---|
| 9 | 5, 3, 0 | 810A, 810B, 810D | 800C |
| 8 | 5, 3 | 810A, 810B | 800C, 800D |
| 7 | 5, 1, 0 | 810A, 810C, 810D | 800B |
| 6 | 5, 1 | 810A, 810C | 800B, 800D |
| 5 | 5, 0 | 810A, 810D | 800B, 800C |
| 4 | 3, 0 | 810B, 810D | 800A, 800C |
| 3 | 3 | 810B | 800A, 800C, 800D |
| 2 | 1, 0 | 810C, 810D | 800A, 800B |
| 1 | 1 | 810C | 800A, 800B, 800D |
| 0 | 0 | 810D | 800B |

It will be recognized from this table that the concurrent position of cams 800 at a Medium height cam portion for those cams which have not previously latched members 810 will determine the time the mechanical impulse is transmitted.

The mechanical impulse transmitted to link 863 causes the engagement of a clutch to rotate a printing wheel 860 to a selected digit position.

When the clutch is engaged it is driven by a shaft 839, rotated by means to be later described.

For each printing order there is pivoted on a rod 866 a triple arm member consisting of arms 864, 865 and a clutch release arm 867.

Shaft 839 has secured thereto a tube 868 which is fluted transversely along its periphery to provide clutch notches 869. Tube 868 constitutes the driving clutch member. Encircling the clutch tube 868 is a plurality of gears 870, there being one gear for each order of the printing mechanism. For mounting the gears 870 on the clutch tube 868 each gear has integral therewith a flange 872. To provide for the lateral spacing between the gears 870 the gears are guided by guide slots 871 formed in guide blocks 873 and 874. By such spacing members the gears 870 are separated to allow independent rotation and to also locate a clutch pawl 876 which is pivoted on the related gear to cooperate with the clutch release arm 867. The clutch release arm 867 normally holds the clutch pawl 876 in such position that its tooth 877 is out of engagement with any of the clutch notches 869 of the clutch tube 868. When the clutch release arm 867 is rocked as a result of the actuation of the operating link 863 at a differential time, the clutch is engaged because a spring 878 attached to clutch pawl 876 will rock the latter in order that the clutch tooth 877 will engage a clutch notch 869 determined by the differential time the operating link 863 is actuated. The above described clutch is the printing type selecting clutch and causes the differential rotation of the printing wheel 860, since the gear 870 and the printing teeth of the type carrying wheel 860 are intergeared.

Figs. 1a and 1b show the arrangement of the item and total printing mechanism for a single order and the machine is preferably provided with duplicate devices for printing a plurality of digits of the item or total.

If, as previously described, the operating link 863 was shifted at about 123° as a result of the 5, 3, 0 digit impulses because a readout order represents 9, the clutch release arm 867 would be rocked at this time and pawl 876 would be released and rocked by spring 878 so that clutch tooth 877 engages a clutch notch 869, and printing wheel 860 will thereafter continue to rotate to such position as to present the numeral "9" to the printing line. The differential time at which the operating link 863 is actuated determines the extent of counterclockwise rotation of the printing wheel 860 from a rest position necessary to select a numeral type. After the predetermined extent of rotation of the printing wheel 860 has been effected and the printing impression has been effected, with the type selecting clutch still engaged the printing wheel 860 will continue to rotate until the free end of the clutch pawl 876 strikes the clutch release arm 867 which, in the meantime, has been brought to its normal position, by means of a compression spring 879 (Fig. 1a). When such disengagement is effected the printing wheel 860 is at the normal position shown in Fig. 1a.

Each printing wheel 860 is carried by an arm 881 loosely pivoted upon a rod 882 and provided with a rearwardly extending follower extension 884 which is operated by a cam projection 883 of a cam disk 885 which constitutes a driven member of a printing clutch.

Shaft 838 rotates a clutch tube 886 fixed thereto and likewise encircling the clutch tube 886 is the driven clutch disk 885 upon which is pivotally mounted a clutch pawl 887. Clutch disk 885 and parts carried thereby are guided similarly to gear 870. Associated with the clutch pawl 887 is a clutch release arm 888. When the clutch engagement is effected between the clutch pawl 887 and one of the clutch notches of the clutch tube 886, the disk 885 will be rotated in a clockwise direction, whereby the cam projection 883 will cooperate with the follower extension 884 to rock arm 881 about the rod 882 against the action of the return spring 889. The engagement of the clutch now being described is effected when the printing control magnet 861 for each order is again energized for numeral printing by an "N" impulse.

When the printing clutch engagement has been effected each cam 885 will cooperate with the related follower extension 884 to rock the associated printing arm 881 to force the printing wheel 860 against the usual inking ribbon and platen 890 around which platen is positioned the paper strip to be imprinted. As each arm 881 is rocked against the action of the spring 889, the printing wheel 860 is being rotated counterclockwise but since the printing wheel is now rolling over the gear 870 this rolling action will cause an equal and simultaneous rotation in a clockwise direction. Both of these opposite rotations will, in effect, cause the printing wheel to be substantially immobile when it moves to the right to strike the platen 890, the type striking the platen squarely and firmly to cause a legible impression.

After the printing operation, when cam extension 883 of the cam disk 885 passes by the follower extension 884, spring 889 will now be effective to return the type wheel carrying arm 881 to normal position and the extension 884 now bears against the circular peripheral edge of the cam disk 885.

After the printing operation, since the type selecting clutch is still engaged, the printing wheel 860 continues to rotate as previously stated until the clutch pawl 876 strikes the clutch release arm 867 which, in the meantime, has been positioned to normal, thereby disengaging the type selecting clutch when the printing wheels are at normal position.

The printing clutch continues its engagement for a complete rotation of the cam 885 and the clutch disengagement is effected by the engagement of the clutch pawl 887 with the clutch release arm 888.

As the free end of the clutch pawl 876 strikes the clutch arm 867 there is a tendency to cause the gear 870 to rebound counterclockwise. This action is prevented by the cooperation of a spring-pressed detent 896 with a shoulder 897 of a plate 898 secured to each gear 870. When the normal position of the clutch is obtained the detent 896 will engage the shoulder 897 to prevent such rebound and retain the clutch parts in their normal position.

A somewhat similar rebound preventing mechanism is also provided for the printing clutch which consists of a spring-pressed detent 891 cooperating with the shoulder 899 of the cam disk 885.

Upon the transmission of said "N" impulse, by a circuit to be described, the second energization of the magnet 861 again attracts its armature 815 and shifts link 816. The latter thereupon rocks clutch release arm 824 to unlatch the clutch release arm 888 of the printing clutch. At this time a low portion 820c (see Figs. 1a and 6a) of a cam 820 cooperates with the cam follower extension 821 so as not to restrain the rocking of clutch release arm 824. When the clutch release arm 888 is unlatched a depending extension 835 moves in a clearance portion 826 of said arm 824. Cam disk 885 will now rotate counterclockwise and the cam extension 883 will strike the follower extension 884 at the time the selected numeral type is at the printing line to effect the printing impression.

It is undesirable to have the clutch release arm 888 released whenever link 816 is rocked the first time to rock arm 824 to engage the printing wheel clutch and during this time a high portion 837a of cam 837 cooperates with arm 888 to block it against movement to release the printing clutch. When the N pulse is transmitted, as will be later described, the low portion of cam 837b will cooperate with clutch release arm 888 to permit its rocking to engage the printing clutch. After this the cam rise 837c of cam 837 will function to positively retract the clutch release arm 888 to normal position to cause disengagement of the clutch release pawl 887 after a complete revolution of the printing clutch. At the termination of the operating cycle a cam rise 820d of cam 820 functions to rock the clutch release arm 824 clockwise to again position it beneath the extension 835 of the clutch release arm 888, which previously has been elevated to the position shown in Fig. 1a. The cam rise 820d also shifts link 816 to restore armature 815 to normal if it should stick to the core of magnet 861.

*Gear drive for printer*

In Fig. 2 reference numeral 838 designates the printing impression drive shaft which is driven at a uniform speed of rotation for each cycle of the operation of the machine. The drive shaft 822 has secured thereto a gear 940 which drives a gear 941 secured to the printing impression drive shaft 838 to rotate the latter at a uniform speed of rotation of one and a half revolutions for each revolution of drive shaft 822.

Shaft 839 represents the type selecting drive shaft which rotates two and a half revolutions for each operating cycle. The shaft 839 is driven at times with a uniform speed of rotation synchronous with the drive shaft, but at other times the speed of rotation given to shaft 839 is decreased or increased with respect to drive shaft 838, in order to select the desired alphabet type of a selected group of alphabet type. This means to effect the variable drive of shaft 839 is disclosed in full detail in Patent No. 2,439,445, issued to H. S. Beattie, and since the alphabet printing is of no concern here it need not be described to understand the present invention. With such variable speed drive the shaft 839 will rotate the type wheel at a decreased speed to present the selected numeral type to the platen at about 330° of the cycle, at which time the previously clutched printing cam 885 will have its cam projection 883 in position to strike the projection 884 to impress the selected numeral type against the platen 890.

The machine includes a driving means driven by the shaft 822 for rotating the cams 800A, 800B, 800C and 800D, 820, 825, 837 and 887 in synchronous relationship and such cams are driven one complete revolution for each operating cycle.

The driving means for driving cams 800A, 800B, 800C and 800D will now be described. Secured to shaft 822 is a gear 1040 (Fig. 2) which, through a gear 1041, drives a gear 1042 secured to the drive shaft 1043 for the cam 800D. Shaft 822 is extended to directly drive the cam 800C. Referring to Fig. 2, gear 1040 through a gear 1044 drives a gear 1045 secured to the drive shaft 1046 for cam 800B. Gear 1045, through an idler gear 1047, drives a gear 1048 secured to the drive shaft 1049 for the cam 800A. By such driving means the cams 800A, 800B, 800C and 800D are driven synchronously.

Referring to Fig. 2 gear 1044 has rotatable therewith a gear 1050 which, through an idler gear 1051, drives a gear 1052 attached to the shaft 1053 to which the cam 825 is secured.

Gear 1050 also meshes with a gear 1054 secured to a shaft 1055 to which shaft the cam 820 is secured.

Also referring to Fig. 2 to drive shaft 838 there is secured a gear 1056 which meshes with a larger gear 1057 secured to a shaft 858 to which shaft the cam 837 is secured.

Thus, through the intergearing last described, the operating cams 820, 825 and 837 are driven synchronously with the operating cams 800A, 800B, 800C and 800D.

*Automatic group control*

Figure 5A:
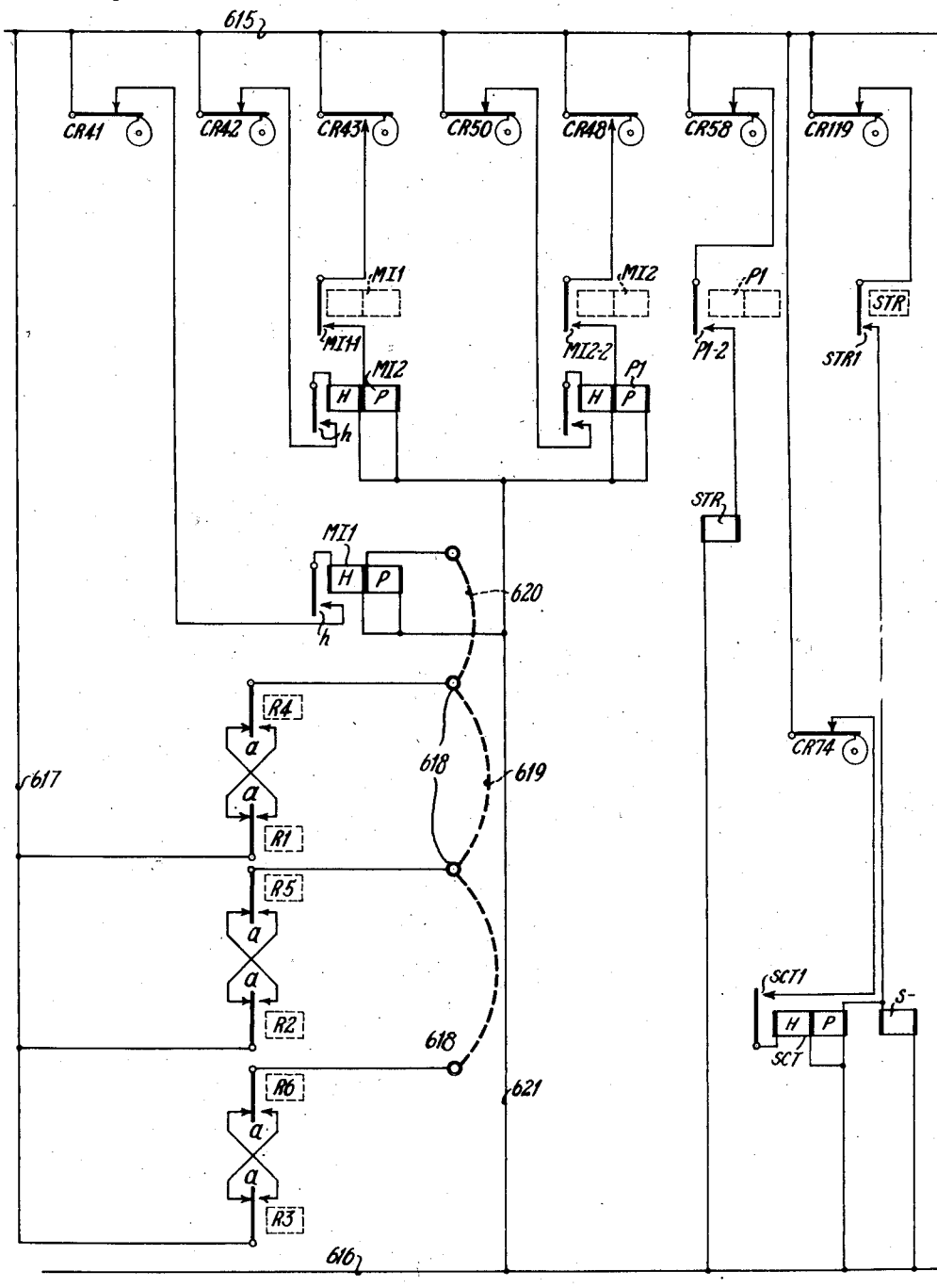

In record controlled accounting machines in which the present invention is preferably embodied, it is desirable to initiate total taking and accumulator reset operations under control of the well known automatic group control means. Briefly, such means includes devices for analyzing the holes in corresponding columns, determining the presence of similar or dissimilar holes in the compared columns, and upon detecting a group number change, total taking operations are initiated. The arrangement for analyzing such holes and picking up comparing relays is well known and for this reason only the comparing circuits for minor control are shown in Fig. 5a. As is well known, two paired relays are energized under control of the holes in corresponding columns and such paired relays consist for the minor control of the three orders shown herein; R1 and R4 relays, R2 and R5, and R3 and R6. Upon an occurrence of holes at the same index point positions the "a" transfer contacts of R1 and R4 relays are concurrently transferred and upon dissimilarity of holes only one of such "a" contacts is transferred. From the line side 615 there is a wire connection 617 supplying current to the comparing circuit. When the transfer contacts of paired relays R1 and R4 are concurrently transferred, the circuit between wire 617 and the plug socket 618 remains open. If either relay R1 or R4 alone is energized, then one of the "a" contacts transfers, thus completing the circuit from line 615, wire 617, R1a contracts now transferred by way of example, R4a transfer contacts now normal, to plug socket 618. When comparing is effected by three orders, as shown by way of example, interconnecting plug connections 619 are made, and extending from one of the plug sockets 618 there is a plug connection 620 which extends any closed comparing circuit to pickup coil of the MI1 relay, which latter is connected by the wire 621 to the other line side 616. MI1 relay closes the "h" contacts and a hold circuit extends through such contacts and CR41 cam contacts to the line side 615. The MI1 relay is known herein as the minor control relay and initiates printing of totals from both totalizers concurrently, and then resetting each accumulator under control of the readout associated with the other accumulator.

The minor control relay MI1 closes its MI1—1 contacts so that when CR43 cam contacts close a circuit will be completed from line 615, through CR43 cam contacts, MI1—1 relay contacts now closed, pickup coil of MI2 relay, wire 621 to line side 616. MI2 relay is held up by a hold circuit through the "h" contacts and CR42 cam contacts, to line side 615.

Referring now to Fig. 5a, at 305° when cam contacts CR48 close a circuit is completed from line side 615, cam contacts CR48, MI2—2 relay contacts now closed, pickup coil of the PI relay to line side 616. A hold circuit for PI relay is completed through the "h" relay contacts and cam contacts CR50 to line side 615. Cam contacts CR50 hold the PIH relay coil energized until about 288° of the cycle in which total printing and accumulator reset operations are effected for both accumulators concurrently.

*Total printing and accumulator reset control relay*

By means of the energization of the STR2 relay the machine is conditioned to print a total from the pair of accumulators and thereafter reset each. In the cycle in which a change in minor group numbers has been detected CR58 cam contacts close at 330°, thus completing a circuit from line side 615, CR58 cam contacts, PI—2 relay contacts now closed, the STR total and reset relay to line side 616. Thus, from the timing of CR58 (Fig. 6b) it is evident that the STR relay is held energized until about 275° of the cycle during which a total printing and reset of the two accumulators occur.

*Other relays for conditioning machine for total printing and accumulator reset operations*

These relays are LC, S—, PCC and RN relays (see Fig. 5b) and the energizing circuits thereof will be explained as their requirement is needed for the description of the operation of the machine.

At the end of the cycle in which a minor group number change has been detected CR119 cam contacts close to complete a circuit from line side 615, cam contacts CR119, STR1 contacts now closed, S— relay coil, to line side 616. CR119 cam contacts keep the S— relay closed until about 275° of the cycle during which a total printing and reset occur. When CR122 cam contacts close between 0–78° of the total printing and reset cycle a circuit is completed from line side 615, cam contacts CR122, STR2 relay contacts now closed, LC relay, to line side 616.

With the LC relay energized total printing takes place for each accumulator in the following manner:

*Total printing control circuits*

Total printing from each accumulator is in the present machine performed under control of the associated total readout in conjunction with the combinational code translator described in the section designated "Translator and total digit printing machanism" which converts the combinational hole impulse reading derived from the readout sections to a single digit differentially timed equivalent to thereby select a corresponding digit type of the associated printing mechanism.

Each readout section or order of both accumulators comprises a series of digit contact points 623 (Figs. 5b, 5c), a common current conducting segment 624 and a brush 625 which takes digit positions according to the digit representation of the accumulator order, since it is rotated by the related accumulator wheel in a well known manner. Since it is assumed that both accumulators have received identical amounts the readouts for the pairs of accumulators are shown set to the same total digit representing positions which, as an example, represent a total of 8844. The contact points 623 of like digit values are interconnected by digit impulse transmitting wires marked 9–0. In circuit connection with the digit wires marked 9–0 are cam contacts CR97 to CR106, inclusive. These cam contacts transmit combinations of impulses 5, 3, 1, 0, which are marked alongside of the contacts in Fig. 5b to the two readouts. The timing for the 5, 3, 1, 0 impulses of CR97–106 contacts is shown in Fig. 6b. Thus, according to the digit representation of the accumulator readout, selected combinations of impulses 5, 3, 1, 0 are transmitted. For example, if the brush 663 of a readout order is a 9, the cam contacts CR97 close at times to transmit selected digit impulses 5, 3, 0. CR98 transmits impulses 5, 3, CR99, 5, 1, 0, etc. all as designated on the wiring diagram of Fig. 5b. These impulses are directed by a circuit from line 615, CB circuit breaker contacts, CR102 cam contacts (when 4 is the digit in the units order, for example), the 4-digit wire, contact point 623, brush 625, common current conducting segment 624, STRU relay contacts now transferred, LCU contacts now transferred, to plug socket 626.

For causing the readout sections of accumulator No. 1 to control the desired orders of the combinational code translator and the associated printer No. 1, plug connections 627 are made between plug sockets 626 and plug sockets 628 (Fig. 5c). It should also be noted that during 0–78° of the first part of the cycle when cam contacts CR97–106 transmit impulses 5, 3, 1, 0, the LC and STR relays are energized.

Continuing now with the units order, impulses are directed by the related plug connection 627, plug socket 628 (Fig. 5c), through PCCU relay contacts now normal, RNU contacts now normal, translator control magnet 861 of the units order of printer No. 1 to line 616. This magnet receives the impulses 3, 0 and as previously described the translator converts this combination of impulses to a 4-digit equivalent to cause the engagement of the type wheel clutch to initiate the rotation of the printing wheel to the 4-digit position. Thus, in each order the combinational impulses 5, 3, 1, 0 are selected by the readout for transmission to the code translator and conversion to a differentially timed digit equivalent. When all printing wheels 860 (Fig. 1a) are at their digit positions printing is effected by transmission of an impulse at the N time.

Figure 5B:
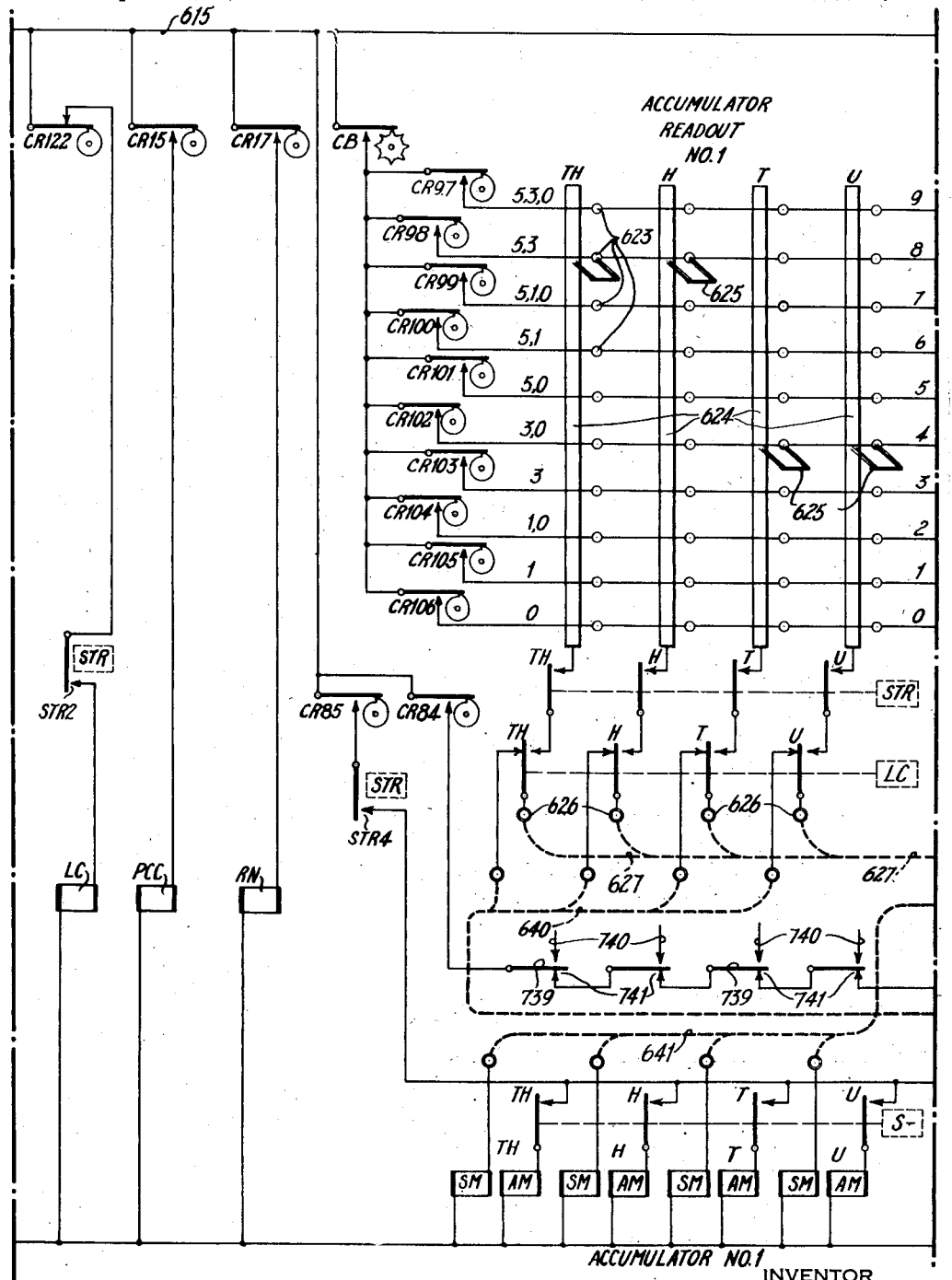
Figure 5D:
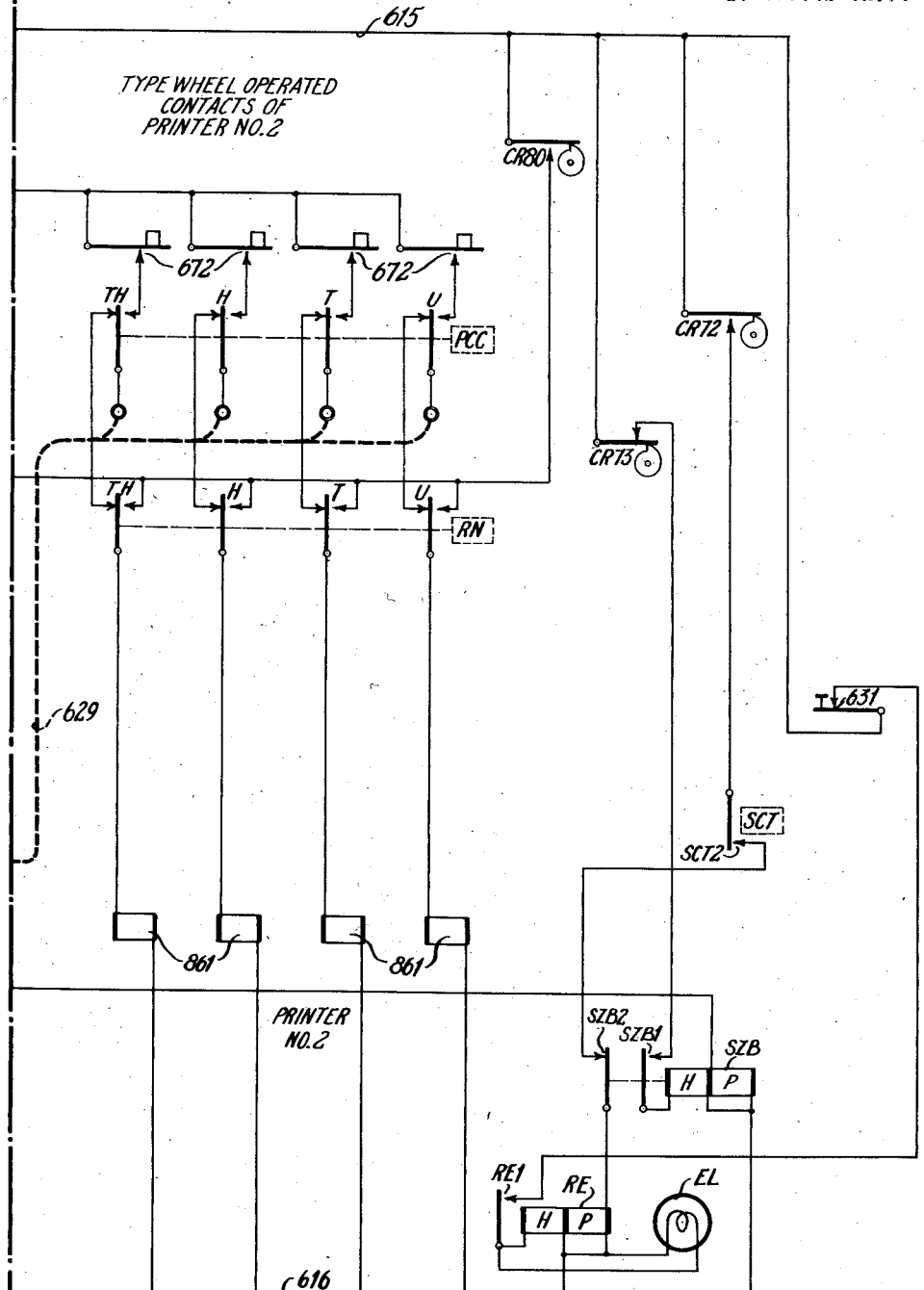

Referring to Fig. 5b at 166° of the cycle cam contacts CR17 close to pick up the RN relay by an obvious circuit. The RN relay transfers the RNU, T, H, TH contacts (Fig. 5c) so that a second impulse is directed to all orders of the translator control magnets 861 by a circuit from line 615, cam contacts CR80 (Fig. 5d), the U, T, H, TH relay contacts of RN relay now transferred, to the respective translator control magnet 861, to line side 615.

In the above manner the total –8844– on the readout of accumulator No. 1 is printed as –8844– by printer No. 1. In the same manner printer No. 2 prints the total on the readout associated with accumulator No. 2, the operative association being effected by the plug connections 629, similar to plug connections 627.

*Circuits to effect resetting of accumulators*

The resetting of each accumulator occurs in the latter part of the same cycle that the total is printed and utilizes differentially timed electrical reset control or stop impulses derived from the print wheel clutch of the other printer. The start impulses are first directed to the start magnets AM of each accumulator. Thereafter, under control of the stop impulses derived from the readout of the other accumulator through the printer each accumulator wheel is rotated in the additive direction from its digit position to the reset position, which in the present machine is the digit 9 position. The stop impulses are directed at such times that the 9 complement of the digit standing on the accumulator wheel is additively entered to thereby bring each wheel to 9.

The engagement of the printing wheel clutch to rotate the printing wheel to a selected digit position is substantially simultaneous with the transmission of the stop impulse sent to the stop magnet SM. Reverting to Figs. 1a and 1b, it will be recalled that the combinational code translator causes a movement of the link 863 at differential points in the cycle, as is indicated in Fig. 6a. This causes the engagement of the printing wheel clutch at a differential time and after the engagement is effected type wheel contacts 672 (Fig. 1a) are closed at differential points in the cycle to transmit a stop impulse to the accumulator stop magnet SM of the same order.

Referring to Fig. 1a, the plate 898 has an inclined cam edge 670 which cooperates with and rocks the double arm 896 shortly after the clutch engagement has been effected. The lower arm 671 of double arm 896 bears against the top blade of contacts 672. Thus, it is evident that shortly after the engagement of the printing wheel clutch the slight clockwise movement of double arm 896 will close contacts 672. This closure occurs, of course, after the clutch has been engaged and the times that contacts 672 are closed to the transmit differentially timed impulses 0–9 are shown in Fig. 6a.

Before the circuits for transmitting the stop impulses are explained, the impulsing circuits for energizing the start magnets AM of all denominational orders will first be described. Referring to Fig. 5a, it will be recalled that the S– relay is picked up at the last part of the cycle in which a group number change has been detected and CR119 cam contacts maintain the energization of this relay during the total printing and reset cycle up to about 275°. Therefore, when CR85 (Fig. 5b) cam contacts close at about 140° of the cycle a circuit is closed from the line side 615, cam contacts CR85, STR4 relay contacts now closed, through the S–, U, T, H, TH, relay contacts now closed, to each of the AM start magnets of the four denominational orders of both accumulators, to line side 616. This will cause the engagement of all accumulator wheel clutches and if any accumulator wheel stands at any other digit position than 9, the rotation of said accumulator wheel will be initiated to bring it by a movement which is the complement of the digit on the wheel to a 9 digit reset position.

During the rotation of the accumulator wheels stop impulses are directed to the SM stop magnets by a circuit now to be described. By an obvious circuit shown in Fig. 5b when CR15 cam contacts close between 100–315° of each cycle the PCC relay is energized to transfer its two sets of U, T, H and TH relay contacts. The stop impulse circuit is from the line 615, through circuit breaker contacts CR82 (Fig. 5c) which send impulses during the differential times that the type wheel contacts 672 are closed, thence through the respective U, T, H or TH relay contacts of the PCC relay now transferred, to the plug socket 628, a related plug connection 627, or 629, plug socket 626 through the respective U, T, H and TH relay contacts of the LC relay now deenergized, plug connection 640, or 641, to the respective SM stop magnet of the accumulator, to line 616. By means of plug connection 640 accumulator No. 2 is reset under control of printer No. 1, and by means of plug connection 641 accumulator No. 1 is reset under control of printer No. 2.

Recalling that it was assumed that the accumulator represented 8844, with the brush 625 standing at the 4-digit position the contacts 672 of this order will be closed at 220°. However, the start impulse directed by CR85 cam contacts will have moved the accumulator wheel from 4 to 9 or five steps at the time that the stop magnet SM receives the impulse from the type wheel controlled contacts 672. Thus, the accumulator wheel will be stopped at the 9-digit position. For the hundreds and thousands order where 8 was assumed to be the total digit representation contacts 672 will be closed at 160°. However, the start impulse directed by CR85 cam contacts will have moved the accumulator wheel from 8–9 or one step at the time that the stop magnet SM receives the impulse from the type wheel contacts 672. Thus, the accumulator wheels for these orders will be stopped at the 9 digit position. However, for any order where 0 is represented the start impulse to the start magnets AM of such orders will initiate the 9 steps of movement. The printing wheel clutch is engaged to rotate print wheel 860 counterclockwise at about the same time that the print wheel arm 881 is rocked to rotate print wheel 860 clockwise, as a result of the N printing impulse. This will cause the printing from the 0 digit type. Engagement of the printing wheel clutch causes a later closure of contacts 672 sending a stop impulse to the SM magnet after the accumulator wheel has rotated nine steps to bring the wheel to the 9-digit position.

If a wheel stands at 9 the closure of contacts 672 to send a stop impulse at 140° after the print wheel clutch is engaged to select the 9 type is coincident with or slightly earlier than the start impulse transmitted to the AM magnet by CR85 cam contacts. This prevents engagement of the clutch and the wheel remains at 9.

Indication of disagreement in totals

From the preceding it is apparent that if the totals represented on both readouts are correct both accumulators will be brought to their normal reset positions. If the arrangement were such that each accumulator was reset under control of its associated readout, such accumulator would come to its reset position even though the total disagreed with the total on the other readout. By resetting each accumulator under control of the readout of the other accumulator, a cross check is obtained and errors in totals are ascertained with certainty.

The erroneous reset position of an accumulator wheel reflects a disagreement in the totals represented on both readouts and may be caused by an error in the transmission of an amount to either accumulator, or may be caused in the printing and resetting operation. Accounting machines of the type in which the present improvement is applied are highly accurate in their operations but sometimes fail, due to need of adjustments and service; and at other times the failure may be caused by the transmission of an erroneous reset impulse and may be due to the omission of a plug connection. It is, therefore, obvious that for an accumulator to come to its reset position the readout of the other accumulator which controls it must represent the same total.

Assuming now that for any of the above reasons or others that one accumulator has not been brought to its 9 digit reset position, a test circuit is provided in the present machine to determine this fact. This fact is indicated in the present machine by the lighting of a lamp under control of a relay energized when such erroneous condition has been detected. However, this relay may determine further operations of the machine, that is, the discontinuance of card feeding operations for the next group of cards or to stop the operation of the machine.

Referring now to Figs. 5b and 5c, the transfer control contacts 739, 741 for the four denominational orders of each accumulator are in a series circuit connection so that when all orders represent 9, which is when each contact blade 739 makes contact with a related contact point 741, a pickup circuit will be completed from line side 615, through cam contacts CR84 which close at the end of the total printing and reset cycle, thence through the eight sets of contacts 739, 741, through the pickup coil of the SZB relay to the line side 616.

A hold circuit for the H coil of SZB is provided by a circuit from the line side 616, through the H coil, the SZB1 hold contacts, cam contacts CR73, to the line side 615.

The conditioning of a circuit to energize the error indicating relay RE is under control of the SCT relay (see Fig. 5a). The pickup coil of SCT is in shunt with the S— relay coil and, therefore, is energized by the same energizing circuit when cam contacts CR119 close at the beginning of the cycle. A hold circuit for the H coil of SCT at the end of the cycle is from the line 616 through the H coil, SCT1 relay contacts, CR74 cam contacts, to the line 615. CR72 cam contacts are closed at the end of the cycle to attempt to energize the RE relay by the following circuit: From the line 615, through CR72 cam contacts, SCT2 relay contacts now closed, through the SZB2 relay contacts which are open if both accumulators have been reset in all orders to 9, or are closed if any order is not at the 9 digit position after a reset operation, to the pickup coil of RE relay to line side 616.

Closure of the RE1 contacts provides a hold circuit for REH relay coil and connects an error indicating lamp EL across the hold coil which lamp is held lighted until manually operated contacts 631 open. Besides extinguishing the lamp EL the contacts 631 break the hold circuit for the RE relay. If so desired, the RE relay may have supplemental contacts which are in the card feed controlling circuit or stop circuit of a record controlled accounting machine so as to terminate card feeding operations or stop the machine. The EL lamp is located in view of the operator so that this light will indicate that there has been an error.

While there have been shown and described and pointed out the fundamental novel features of the invention, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a cyclically operable accounting machine, the combination of a pair of accumulators A and B, each of which receives the same amounts to represent duplicate totals, means under control of accumulator B to reset accumulator A, means under control of accumulator A to reset accumulator B, means to effect the operation of both resetting means concurrently in the same cycle, and means to test the digit positions of both accumulators to ascertain whether they both represent the normal digit reset position at the termination of the accumulator resetting operation.

2. In a cyclically operable accounting machine wherein two accumulators A and B represent at the termination of accounting operations identical totals, a pair of printing mechanisms for printing said totals, means for setting each printing mechanism under control of the associated accumulator to print the total represented thereon, means under control of the A accumulator and the printing mechanism which prints the total under control of accumulator A to reset accumulator B, means under control of the B accumulator and the printing mechanism which prints the total under control of accumulator B to reset accumulator A, and means to test the digit positions of both accumulators after the reset operation to ascertain whether they both represent the normal reset digit positions.

3. In an accounting machine, a plurality of accumulators A and B representing identical totals, an electrical total readout for each accumulator, a printing mechanism for each readout, means controlled by each readout for setting the associated printing mechanism, means controlled by the A accumulator readout and the printing mechanism associated with the A accumulator for resetting the B accumulator and by the B accumulator readout and the printing mechanism associated with the B accumulator for resetting the A accumulator, and means for testing the digit positions of both accumulators after the reset operation to ascertain whether they both represent the normal reset digit position.

4. In an accounting machine, the combination of two readouts representing identical totals, two accumulators A and B for setting said readouts having for each order a start magnet and a stop magnet, an electrically controlled printing mechanism controlled by each readout for adjusting the setting of the printing mechanism to total digit positions, electrical contacts operated by said printing mechanisms for transmission of reset impulses according to its settable digit positions to said stop magnets, means for energizing said start magnets for initiating the operation of both accumulators to reset positions, means controlled by the electrical contacts of the printer controlled by the readout associated with the A accumulator to transmit reset impulses to the stop magnets of accumulator B for terminating the operation of accumulator B at reset position, and other means controlled by the electrical contacts of the printer controlled by the readout associated with the B accumulator to transmit reset impulses to the stop magnets of accumulator A for terminating the operation of the accumulator A at reset position.

5. In a cyclically operable electrically controlled accounting machine, the combination of two readouts each associated with accumulators A and B which represent identical totals, a start magnet and stop magnet for each order of both accumulators to start and stop rotation of the accumulator wheels, a combinational impulse translator for each accumulator for receiving combinational impulses selected by the associated readout and converting them to a single differentially timed reset impulse, means for transmitting combinations of impulses to both readouts concurrently to control the translators, means for transmitting an impulse to the start magnets of both accumulators to start the rotation of the accumulator wheels towards reset positions, means to transmit reset impulses derived from the translator associated with accumulator A to the stop magnets of the B accumulator and reset impulses derived from the translator associated with accumulator B to the stop magnets of the A accumulator to stop rotation of said accumulator wheels at reset digit positions, and means to test the digit positions of each accumulator wheel to determine whether it has been brought to a normal reset digit position under control of the wheel of the other accumulator.

6. In an accounting machine for verifying totals the combination of two accumulators A and B, a start magnet for engaging an accumulator wheel clutch of each order of each accumulator, a stop magnet for disengaging said accumulator clutch of each order of each accumulator, a plurality of readouts settable by the accumulators, a printing mechanism associated with each readout, means including a plurality of relays for transmitting impulses under control of each of said readouts for setting the associated printing mechanism to print totals represented thereon, contacts adjusted by said printing mechanism to transmit reset impulses to said stop magnets, circuit connections from contacts adjusted by the printer associated with the A accumulator for transmitting said reset impulses to the stop magnets of the B accumulator and other circuit connections from contacts adjusted by the printer associated with the B accumulator for transmitting reset impulses to the stop magnets of the A accumulator, said circuit connections including one of said relays, means for energizing said relays in timed succession for causing the transmission of impulses from the readouts for setting the printing mechanism and thereafter causing the transmission of reset impulses to the stop magnets under control of said contacts, and means for concurrently energizing said start magnets to engage said clutches to initiate movement of the accumulator wheels towards reset position.

EDWARD J. RABENDA.

REFERENCES CITED

The following references are of record in the file of this patent:

UNITED STATES PATENTS

| Number | Name | Date |
|---|---|---|
| 2,359,616 | Bryce | Oct. 3, 1944 |